Patented Nov. 29, 1938

2,138,458

UNITED STATES PATENT OFFICE 2,138,458

PROCESS FOR IMPROVING THE FASTNESS OF SUBSTANTIVE DYEINGS

Ferdinand Münz, Frankfort-on-the-Main, and Karl Keller and Otto Trösken, Frankfort-on-the-Main-Fechenheim, Germany, assignors to General Aniline Works, Inc., New York, N. Y., a corporation of Delaware No Drawing. Original application March 27, 1936, Serial No. 71,172. Divided and this application September 24, 1937, Serial No. 165,483. In Germany April 3, 1935

4 Claims. (Cl. 8—74)

This is a division of our application Serial No. 71,172, filed March 27, 1936 relating to "Expedients useful for improving the fastness of dyeings."

Our present invention relates to a process for improving the fastness of dyeings, which have been prepared on cellulose materials by means of substantive dyestuffs.

It is well known that dyeings obtained on cellulose materials by means of substantive dyestuffs can be improved as regards fastness by treatment with salts of certain organic bases. A great number of such bases has already been proposed for this purpose. Most of them are characterized by the fact that they contain in the molecule a long aliphatic carbon chain of at least 7 carbon atoms.

Such bases are capable of improving the fastness to water and to cross dyeings and—as far as they contain pentavalent nitrogen—to perspiration, but they can not substantially improve the fastness to washing which is of considerably more importance.

Our present invention has for its object the after-treatment of such dyeings with solutions containing products corresponding to one of the general formulae:

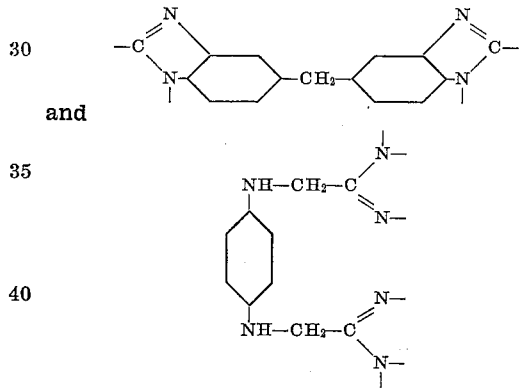

and in which formulae at the free valences of the imidazole rings a member of the group consisting of phthalic acid, acetic acid in the case of the first formula and benzene in the case of the last formula, is attached.

The favorable effect of the present compounds is obtained by the fact that they do not contain a long aliphatic chain and that therefore their reaction products with dyestuff acids are insoluble not only in water but also in solutions of soaps. By the fact that they contain nitrogen atoms of basic character in the highest valency the fact is obtained that the salts of these compounds with the dyestuff-acids of the used substantive dyestuffs are not decomposed by the alkali used for washing the dyeings.

In order to further illustrate our invention the following examples are given, the parts being by weight and all temperatures in degrees centigrade. We wish it, however, to be understood that our invention is not limited to the particular products nor reaction conditions mentioned therein.

Example 1

228 parts of 3,4,3',4'-tetramino-diphenylmethane are mixed with 150 parts of phthalic anhydride and the mixture is heated to about 180 to 200° until the splitting off of water is finished. The fused mass obtained is powdered, extracted with hot sodium carbonate solution and fried. 100 parts of the imidazole thus obtained are dissolved in 50 parts of formic acid and 300 parts of water and the free base is precipitated in fine dispersion by the addition of sodium carbonate. The suspension is treated with 200 parts of dimethyl sulfate in the presence of an excess of alkali. Then the product formed is dissolved by the addition of great quantities of water, the solution obtained is filtered and precipitated by the addition of sodium chloride. So it is obtained as a brownish powder, easily soluble in water.

When dyeings obtained by means of substantive dyestuffs are aftertreated with a solution of the above product they exhibit a relatively good fastness to washing.

Dyeings after-treated with a product obtained by peralkylating an imidazole which corresponds probably with the following formula:

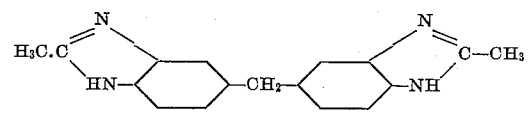

and which can be obtained in an analogous manner from 3,4,3',4'-tetraamino-diphenylmethane by the action of acetic acid, exhibit a considerably increased fastness to washing too.

Example 2

A mixture of 224 parts of p-phenylene diglycine (see German Patent No. 145,062) and 216 parts of o-phenylene-diamine is heated to about 200° until the splitting off of water is finished. The imidazole formed which corresponds with the following formula:

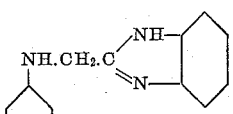

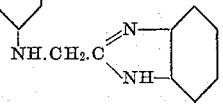

may be isolated in a similar manner to that described in Example 1. It is converted into the tertiary base by the action of dimethyl sulphate and sodium carbonate in an aqueous solution. 30 parts of the tertiary base are mixed with 70 parts of the methyl ester of p-toluene-sulfonic acid and the mixture is heated to about 100° for 3 hours. The fused mass is dissolved in water and the solution obtained is neutralized and concentrated by evaporation.

The new product is likewise capable of improving considerably the fastness to washing of dyeings obtained by means of substantive dyestuffs.

We claim:

1. Process for improving the fastness of dyeings which have been prepared on cellulose materials by means of substantive dyestuffs by after-treating them with solutions containing products selected from the group consisting of:

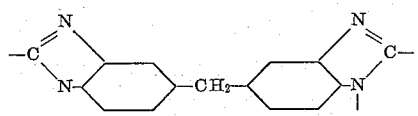

and

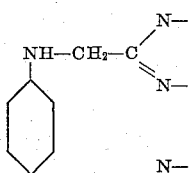

in which formulae at the free valences of the imidazole rings a member of the group consisting of phthalic acid, acetic acid in the case of the first formula and benzene in the case of the last formula is attached.

2. Process for improving the fastness of dyeings which have been prepared on cellulose materials by means of substantive dyestuffs by after-treating them with solutions containing a product obtained by the action of dimethylsulfate on the imidazole product obtained by decomposing 3,4,3',4'-tetraamino-diphenylmethane with phthalic anhydride which ammonium base is in the form of their salts a brownish powder, easily soluble in water.

3. Process for improving the fastness of dyeings which have been prepared on cellulose materials by means of substantive dyestuffs by after-treating them with solutions containing a product obtained by the action of dimethylsulfate on the imidazole product of the formula:

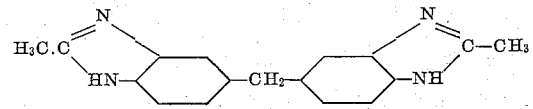

4. Process for improving the fastness of dyeings which have been prepared on cellulose materials by means of substantive dyestuffs by after-treating them with solutions containing a product obtained by the action of dimethylsulfate on the imidazole product of the formula:

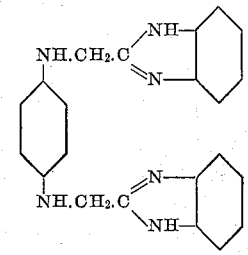

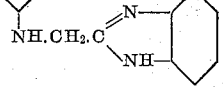

FERDINAND MÜNZ.
KARL KELLER.
OTTO TRÖSKEN.